Feb. 2, 1960

J. K. McPHERSON ET AL 2,923,917

AIRCRAFT LOCATING DEVICE

Filed April 5, 1957

INVENTORS
JOHN K. McPHERSON,
ELLEN D. McPHERSON,
BY

McMorrow, Berman & Davidson

ATTORNEYS.

INVENTORS
JOHN K. McPHERSON,
ELLEN D. McPHERSON
BY
McMorrow, Berman & Davidson
ATTORNEYS.

Feb. 2, 1960
J. K. McPHERSON ET AL
2,923,917
AIRCRAFT LOCATING DEVICE
Filed April 5, 1957
4 Sheets-Sheet 3
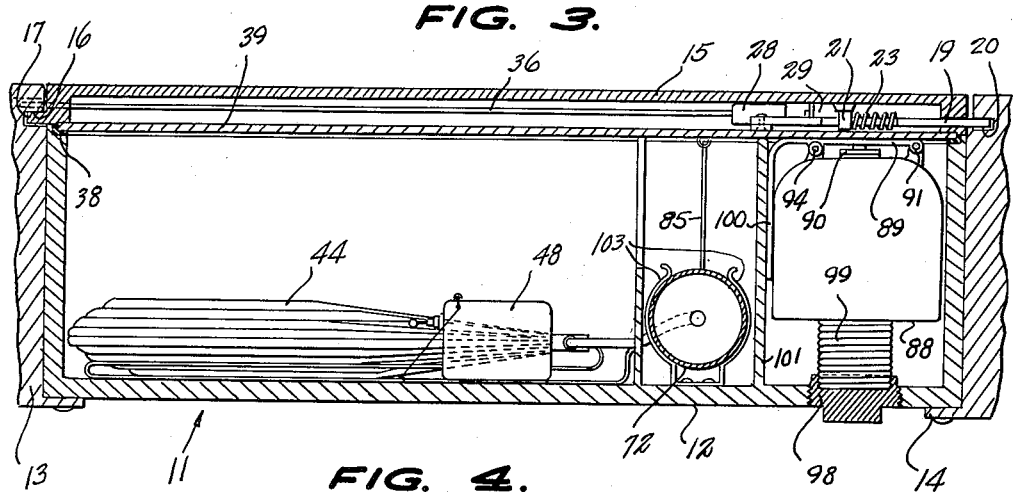
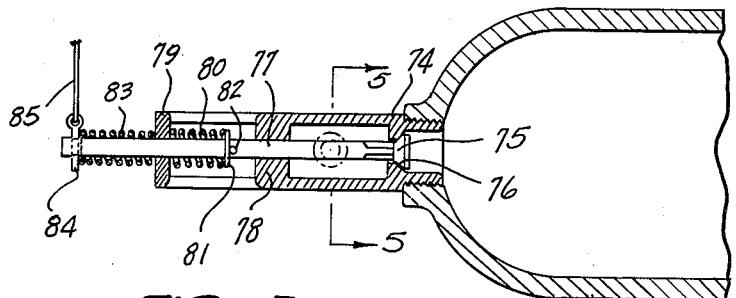
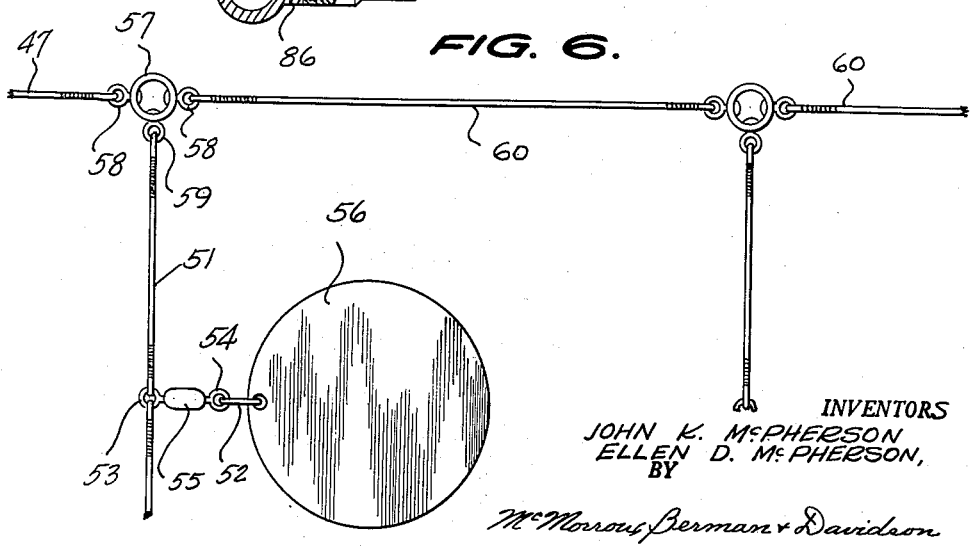
INVENTORS
JOHN K. McPHERSON
ELLEN D. McPHERSON,
BY
McMorrow, Berman + Davidson
ATTORNEYS.

Feb. 2, 1960
J. K. McPHERSON ET AL
2,923,917
AIRCRAFT LOCATING DEVICE
Filed April 5, 1957
4 Sheets-Sheet 4
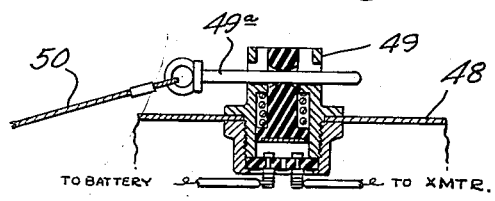
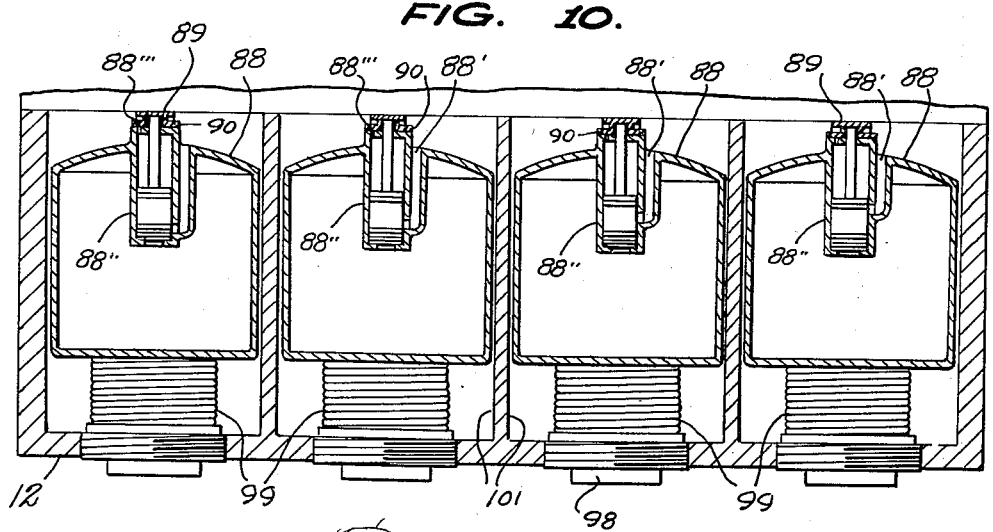
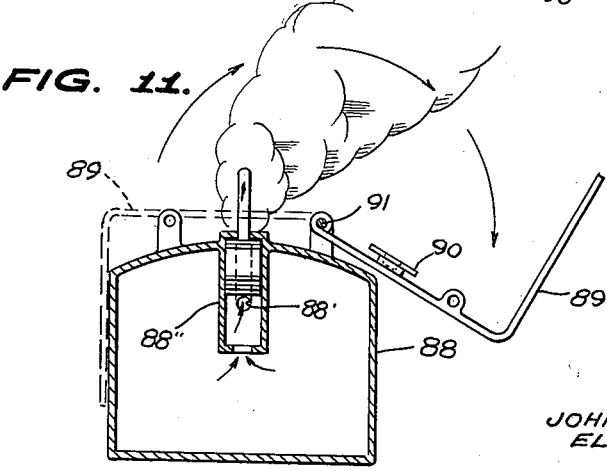
INVENTORS
JOHN K. McPHERSON,
ELLEN D. McPHERSON,
BY
*McMorrow, Berman + Davidson*
ATTORNEYS.

United States Patent Office 2,923,917
Patented Feb. 2, 1960

2,923,917
AIRCRAFT LOCATING DEVICE
John K. McPherson and Ellen D. McPherson,
Sierra Vista, Ariz.
Application April 5, 1957, Serial No. 650,964
5 Claims. (Cl. 340—27)

This invention relates to aircraft locating equipment, and more particularly to a device for use an aircraft for indicating the position of the aircraft after a wreck or similar accident.

A main object of the invention is to provide a novel and improved apparatus for use on aircraft to indicate the position of the aircraft after a wreck, whereby to assist searchers in locating said aircraft, the device being simple in construction, being compact in size, and being arranged so that it will operate automatically to release its marker elements responsive to impact of the aircraft.

A further object of the invention is to provide an improved device for locating a wrecked aircraft, said device involving relatively inexpensive components, being easy to install on the body of an aircraft, being operable either manually or in response to impact of the aircraft, and being provided with means for giving a visual indication in several different conspicuous representations of the location of an aircraft which has been wrecked, and at the same time to provide a radio distress signal.

A still further object of the invention is to provide an improved apparatus adapted to be installed on an aircraft and being automatically responsive to impact of the aircraft to release a plurality of marker devices serving as means for readily locating the wrecked aircraft, the apparatus being arranged as a compact unit which may be installed on any exterior portion of an aircraft and being arranged so that it may be operated either manually or automatically whenever an emergency requiring its use arises.

Further objects and advantages of the invention will become apparent from the following description and claims, and from the accompanying drawings, wherein:

Figure 3 is a transverse vertical cross sectional view taken on line 3—3 of Figure 2.

Figure 4 is an enlarged cross sectional detail view taken on line 4—4 of Figure 2.

Figure 5 is a transverse vertical cross sectional view taken on line 5—5 of Figure 4.

Figure 6 is a fragmentary enlarged detail view of a portion of the signal flag assembly employed as a part of the apparatus of Figures 1 to 5.

Figure 9 is an enlarged sectional view taken on the line 9—9 of Figure 2.

Figure 10 is an enlarged sectional view taken on the line 10—10 of Figure 2.

Figure 11 is an enlarged sectional view of one of the smoke pots of the present invention, with the valve in released position.

Figure 2:
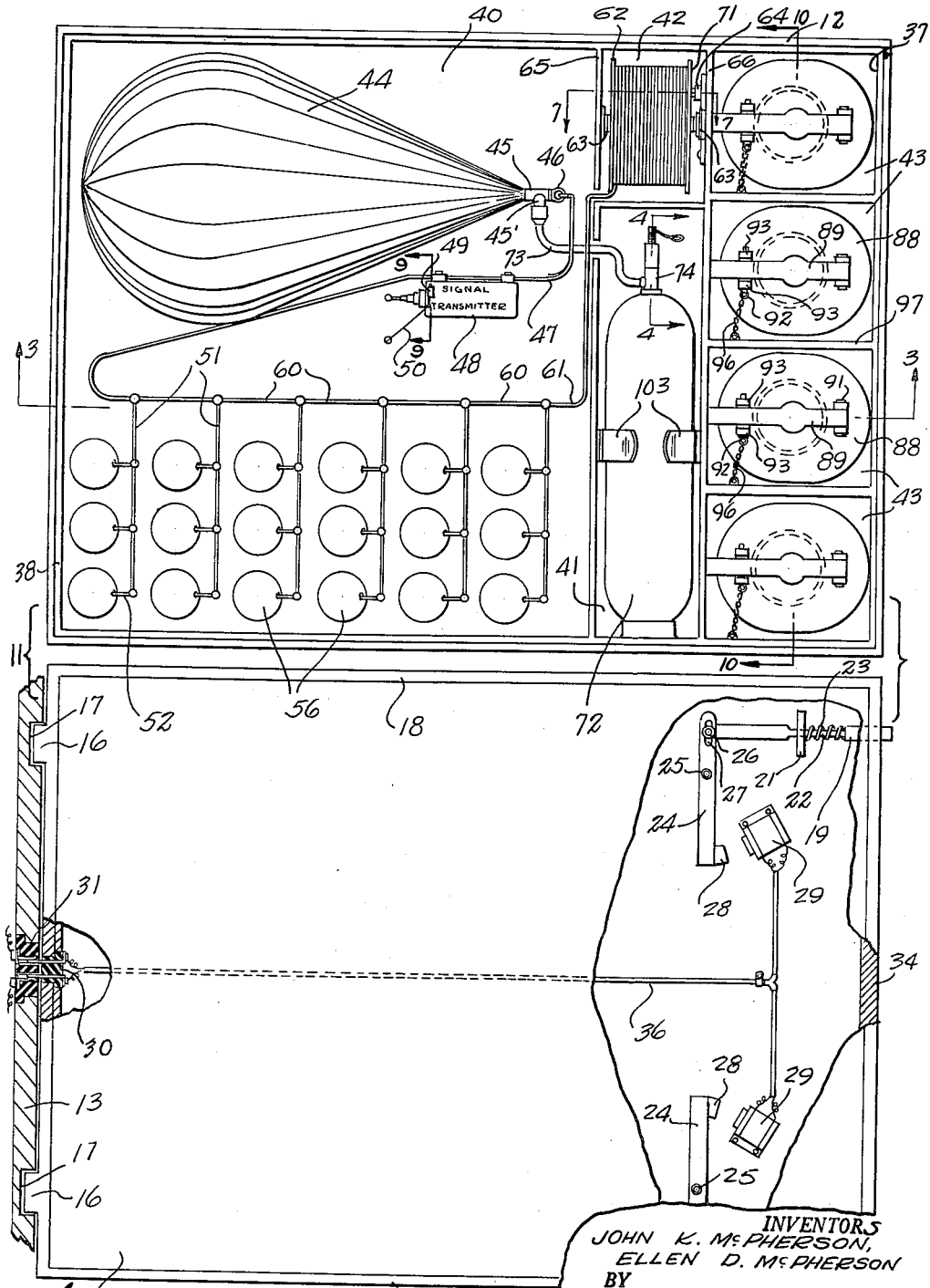
Figure 2 is a fragmentary top plan view, with parts broken away and in cross section, of an aircraft locating apparatus according to the present invention, shown with the top cover removed.

Referring to the drawings, and more particularly to Figures 2 and 3, 11 generally designates an improved aircraft locating apparatus according to this invention. The apparatus 11 comprises a generally rectangular container 12, which may be of any desirable shape, other than rectangular, if so desired, the container 12 being adapted to be mounted in an outer portion of an aircraft, for example, in the roof of an aircraft, on the top surface of an aircraft wing, or on any other outer portion of the aircraft which will experience an impact when the aircraft is wrecked. Thus, as shown in Figure 3, the container 12 is secured in a portion of the outer wall 13 of an aircraft, the outer wall being suitably apertured and being provided with anchoring lugs 14 to which the container 12 may be fastened.

Designated at 15 is a top cover which is formed at one transverse edge with a pair of retaining lugs 16, 16 engageable in correspondingly shaped recesses 17 formed in the wall 13 of the aircraft, as shown in Figure 3, to receive said lugs. The lugs 16 are of sufficient length to positively engage in the recesses 17 when the cover 15 is in a horizontal position, as viewed in Figure 3, but are readily removable from the recesses 17 when the cover 15 is rotated upwardly from its horizontal position.

The cover 15 is formed with a depending peripheral flange 18, and engaged slidably through the flange 18 at the transverse edge of the cover opposite the lugs 16, 16 are a pair of detent bolts 19. The detent bolts 19 are engageable in correspondingly shaped recesses 20 provided in the wall 13, opposite the recesses 17, as shown in Figure 3. The detent bolts 19 extend slidably through supporting brackets 21 secured to the undersurface of the cover 15, the bolts being reduced in cross section at 22 and being provided thereon with coil springs 23 which bear between the brackets 21 and the forward portions of the bolts 19, as shown in Figure 2, biasing the bolts outwardly, namely, toward locking positions.

Respective horizontal levers 24, 24 are pivoted at 25, 25 to the cover 15, the outer ends of the levers being slidably and pivotally connected to the inner ends of the bolts 19, as shown at 26. Thus, the outer end of each lever 24 may be formed with a slot 27 and a pivot bolt 26 may be provided, extending slidably through the slot, and connected rigidly to the end of the associated locking bolt 19, thereby defining a sliding and pivotal connection between the lever 24 and the aforesaid locking bolt 19.

Secured to the inner end of each lever 24 is a relatively heavy block 28 of any suitable heavy magnetic material, the weight of the block 28 being sufficient so that when a substantial impact occurs, the block will act on the associated lever 24 to rotate same and to retract the associated locking bolt 19 from its recess 20.

Mounted on the cover 15 adjacent the respective magnetic blocks 28, 28 are electromagnets 29, 29 which are adapted to attract the magnetic blocks 28, 28 when energized, so as to rotate the levers 24 and to retract the locking bolts from their recesses 20. The electromagnets 29, 29 are connected in parallel to a pair of conductors in a common cable 36, said conductors being connected to the terminals of a male connector plug 30 secured centrally in the flange 18 opposite the locking bolts 19, as shown in Figure 2. The prongs of the plug 30 are engaged in the socket terminals of a female connector 31 mounted in the wall 13 of the aircraft, said socket terminals being connected by suitable wires, not shown, to a source of current on the aircraft through a normally open control switch provided in the pilot's compartment, thus providing manual control of the release electromagnets 29, 29, as well as impact responsive actuation of the levers 24, 24.

The male plug 30 is readily disengageable from the female plug receptacle 31 when the cover 15 is released, as will be presently described.

The main receptacle 12 is formed at its top rim with a peripheral seat 37 provided with a suitable sealing gasket 38. The seat 37 is adapted to receive an auxiliary rectangular cover 39, as shown in Figure 3, the cover 39 being engageable on the gasket 38 and being normally retained thereon by engagement of the bottom edge of the cover flange 18 therewith.

The main receptacle 12 is provided with suitable internal walls defining a main compartment 40, a first auxiliary compartment 41 adjacent said main compartment, a second auxiliary compartment 42, also adjacent the main compartment 40, and a plurality of auxiliary compartments 43 located at the end of the main receptacle 15 subjacent the portion of cover 15 carrying the locking bolt 19.

Disposed in the main compartment 40 is an inflatable balloon 44 of suitable flexible material, the balloon 44 preferably being coated with luminous paint, or similar self-illuminating material, whereby the balloon will be readily visible in the dark or under conditions of low illumination. The balloon 44 is provided with a conduit fitting 45 which includes an eye loop 46 at its end to which is connected a cable 47. Secured on the cable 47 adjacent the conduit fitting 45 is a radio distress signal transmitter 48 which is arranged so that it will operate automatically when the balloon 44 is released and the transmitter is removed from the compartment 40. Thus, the transmitter 48 may be provided with a normally open control switch 49 of any suitable type which has an actuating element, such as a release pin 49a, connected by a cable 50 to the bottom of the compartment 40, the pin being removable responsive to a relatively small amount of tension on the cable 50, and the removal of the pin causing the control switch 49 to close, for example, under the force of a biasing spring forming part of the switch.

Also connected to the cable 47 are a plurality of relatively short auxiliary cable elements 51 of material similar to the cables 47, which may, for example, be copper covered steel wire, the auxiliary cable elements 51 having secured thereto at spaced points thereon additional short cable elements 52. As shown in Figure 6, the cable members 51 may be articulated, as by the provision of loop elements 53, and the auxiliary cable elements 52 may comprise loops pivotally connected to the end loops 54 of swivel brackets 55. The loops 53 and the loops 54 are swivelly fastened to the main body portions of the brackets 55, and the loops 52 are pivotally engaged with the end loops 54. Connected to the loops 52 are respective flange elements 56 of any suitable shape, for example, of circular shape, as shown in Figures 2 and 6, and of suitable highly conspicuous material, such as highly reflective thin sheet aluminum. The respective cables 51 are preferably pivotally connected to ring elements 57, the ring elements being provided with opposing loops 58, 58 and with intermediate loops 59 for connection to the auxiliary cable elements 51, as shown in Figure 6. The loops 58, 58 and 59 are freely rotatable on the rings 57. The respective loops 57 are interconnected between the cable 47 and additional cable lengths 60, as shown in Figure 6, the last cable length 60 being connected to a flexible cable 61 of similar material, namely, copper covered steel wire or the like.

Figure 7:
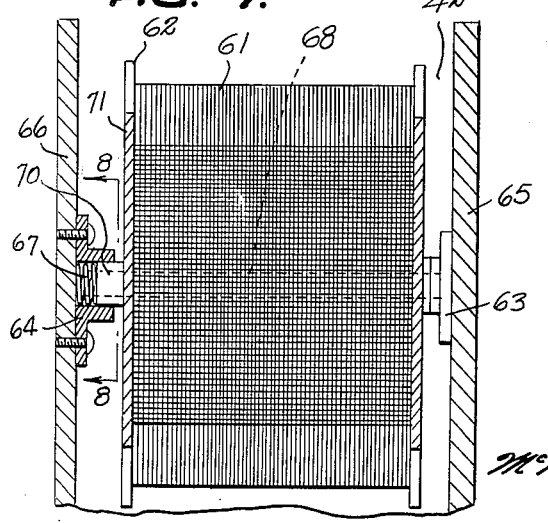
Figure 7 is an enlarged cross sectional detail view taken on line 7—7 of Figure 2.
Figure 8:
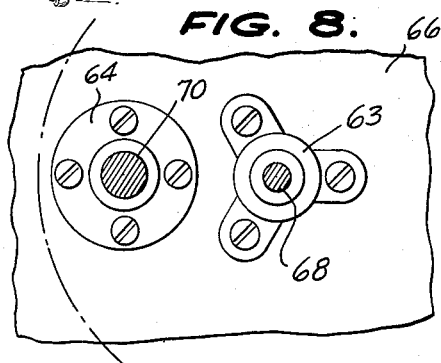
Figure 8 is a cross sectional view taken on line 8—8 of Figure 7.

The cable member 61 is secured to and wound on a reel 62 which is disposed in the compartment and which has a shaft 68 journaled at its opposite ends in respective bearing brackets 63, 63. As shown, the brackets 63, 63 are secured to their respective opposing transverse wall elements 65 and 66 of the compartment 42. Secured to the wall 66 at a point spaced from the axis of the shaft 68 is an annular bracket member 64 in which is slidably positioned a stud member 70 which is biased into frictional engagement with a flange 71 of the reel 62 by a coil spring 67 which bears between the stud 70 and the wall 66, as is clearly shown in Figure 7. The stud members 70 exert a frictional drag on the rotation of the reel 62 which is sufficient to prevent backlash and undesired spinning of the reel when a pull is exerted thereon by the cable element 61. However, spring 67 is sufficiently yieldable to allow smooth unwinding of the cable 61 from the reel as the balloon 44 becomes inflated and rises out of the main container 12.

Yieldably mounted in the compartment 41 is a container 72 of compressed buoyant gas, such as helium, or the like, the container 72 being yieldably connected to the balloon 44 by a flexible conduit 73 which extends from the neck 74 of the container 72 and yieldably engages over a branch 45' of the conduit fitting 45, as shown in Figure 2. The neck 74 comprises a normally closed valve 75 having a valve stem 77 which extends slidably through the end wall 78 of the neck member 74 and through a generally U-shaped bracket member 79 rigidly secured to the member 74. A first coil spring 80 surrounds the stem 77, bearing between the bight portion of the bracket member 79 and a washer 81 on stem 77 restrained against rearward movement by the transverse pin 82 secured to the stem 77 and projecting therefrom on opposite sides thereof. A second coil spring 83 surrounds the outer portion of the stem 77, bearing between the bight portion of the bracket member 79 and the removable release pin 84 engaged through an aperture in the end of the stem 77. The release pin 84 is connected by a flexible cable 85 to the removable inner cover element 39, whereby the pin 84 is extracted when the cover member 39 is lifted upwardly from its seat, as will be presently described. The spring 83 is of sufficient strength to normally overcome the force of the spring 80 and to cause the valve element 75 to sealingly engage on its annular seat 76. When the pin 84 is removed, the spring 83 is released and no longer opposes spring 80, whereby the spring 80 causes the stem 77 to move to the right, as viewed in Figure 4, opening the valve and allowing the compressed buoyant gas to pass through the conduit 73 and conduit fitting 45 into the balloon 44.

As shown in Figure 5, the neck member 74 is provided with a laterally extending, externally threaded conduit portion 86 and the flexible conduit 73 is provided at its end with an internally threaded conduit fitting 87 which is threadedly engaged on the conduit portion 86 to connect the neck member 74 to the conduit 73, as above described.

Mounted in each of the compartments 43 is a smudge pot 88 containing any suitable highly conspicuous gas or vapor, such as smoke, or the like, under pressure. Each smudge pot 88 is provided at its top portion with a pivoted closure bar 89 to which is secured a closure disc 90 engaging the top opening of the smoke pot, the closure bar 89 being pivoted to the top of the smoke pot at 91, as shown in Figure 3, and being held in closed position by a releasable pin member 92 extending through a pair of anchor lugs 93, 93 provided on the top of the smoke pot between which a depending lug portion 94 of the associated closure bar 89 is received. As shown, the pin 92 extends through the anchoring lugs 93, 93 and the intervening lug portion 94.

Each release pin 92 is connected by a flexible member, such as a chain 96, to the adjacent longitudinal wall 97 of the associated compartment 43, whereby the pin 94 will be extracted in response to upward movement of the associated smoke pot 88 out of its compartment 43. Positioned between the bottom of each smoke pot 88 and circularly recessed threaded seat member 98 provided below the pot 88 and centrally thereof, as shown in Figure 3, is a relatively heavy coil spring 99, the spring 99 being of sufficient strength to eject the smoke pot 88 when the cover element 39 is released. As shown in Figure 3, each sealing bar 89 is substantially right angled in shape and has a depending arm 100 which is normally interposed between the smoke pot and the adjacent partition wall 101. When the cover element 39 is released, the spring 99 moves its associated smoke pot vertically upwardly until the arm 100 is elevated above the top edge of the compartment wall 101, after which the locking bar 89 is free to rotate around its pivot 91 and to unseal the smoke pot, allowing the smoke to be ejected therefrom. As previously explained, the release pins 92 are extracted responsive to the upward movement of the smoke pots relative to their partition walls 97, whereby the smoke pots are allowed to release their gas.

The discharge orifices 88' in the valve casings 88" of the smoke pots 88 may be provided with suitable restrictions or suitable timed valve means 88''' so that the smoke pots release their gas in a predetermined sequence after they have become unsealed.

Figure 1:
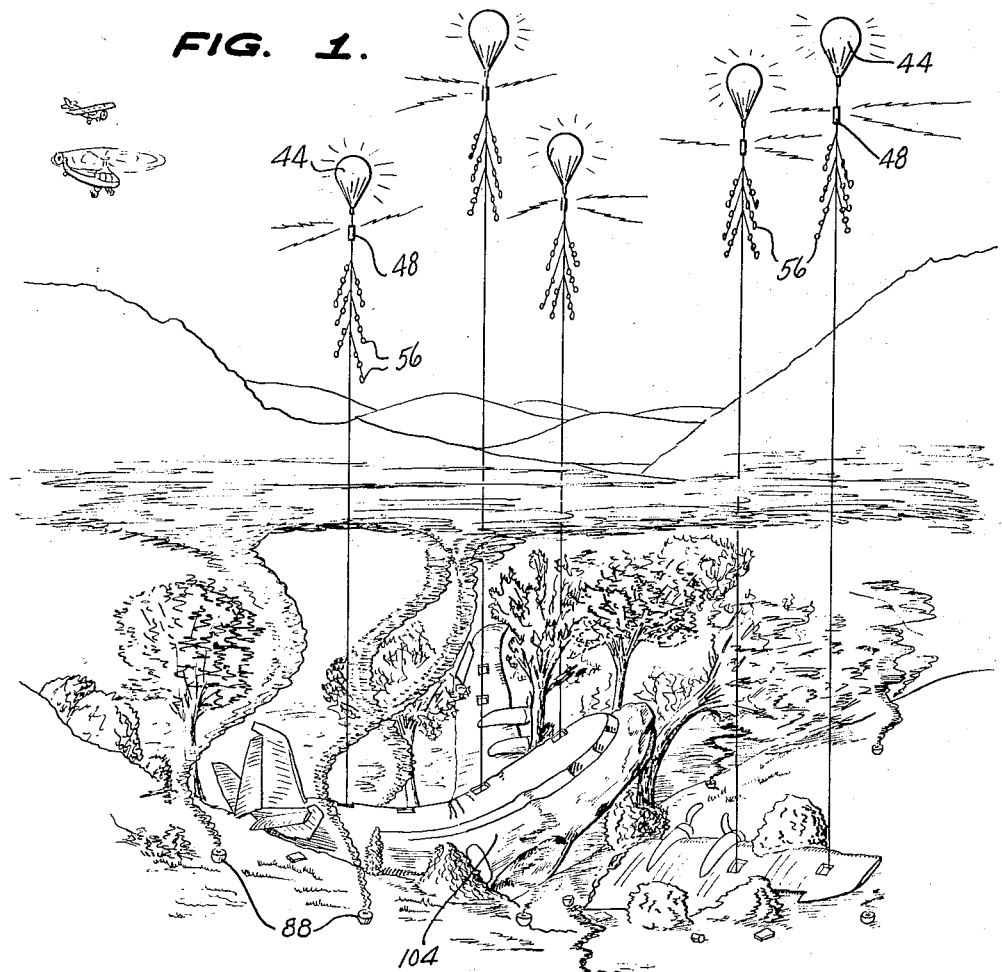
Figure 1 is a pictorial view of a wrecked aircraft provided with position indicating apparatus according to the present invention, as shown in operating position.

In operation, when the fastening bolts 19 are retracted, either responsive to impact of the aircraft or responsive to energization of the electromagnets 29, the springs 99 force the inner cover member 39 and the top cover member 15 upwardly, causing the lugs 16 of cover member 15 to become disengaged from the recesses 17 and thereby completely releasing the smoke pots 88, in the manner above described. The upward movement of the cover element 39 exerts tension on the cable member 85, releasing the spring 83 and causing the valve of the compressed gas receptacle 72 to open, as above described. This inflates the balloon 44, which rises out of the receptacle 12, causing the radio transmitter 48 to start operating and causing the balloon to disengage from the conduit 73, since the bottle is held in compartment 41 by a pair of spring clip arms 103, 103. As the balloon 44 rises, it elevates the cable section 60, carrying the reflective signal flag elements 56 along therewith, the balloon then rising as the cable 61 unwinds from the reel 62 to a substantial height, for example, as shown in Figure 1, wherein a plurality of aircraft locating devices are provided on a wrecked aircraft 104, each of the devices responding to the impact of the aircraft or being manually releasable, as above described, thereby providing a plurality of visible position-indicating devices, each including a luminous inflated balloon 44 and the auxiliary signal elements associated therewith.

If the emergency landing is on water, the gas bottle 72 is so arranged that it will keep afloat until the balloon is inflated to its proper pressure. Thus the bottle 72 is releasably held by the spring clip arms 103, 103.

The balloon should have a capacity lift of at least approximately six pounds to insure that it will have enough lift to force its way through foliage while carrying the cable 61, the reflectors 56 and the transmitter 48. The capacity lift of the balloon should be less than the weight of the container 12. The gas bottle is releasably held by the spring clips 103, 103 so that it may pull out of the container if the container sinks in water before the balloon reaches its capacity lift.

The valve on the gas bottle 72 is automatically opened when the lid of the container is released and ejected, by pulling the pin 84 out of the valve plunger 77, whereby the plunger is released, so that spring 80 causes valve element 75 to unseat, releasing the gas from the bottle so that it may enter the balloon.

The flexible conduit 73 automatically disengages from the balloon fitting branch 45' when full capacity lift of the balloon is attained, thereby releasing the balloon from the gas bottle.

While a specific embodiment of an improved device for locating a wrecked aircraft has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A device for locating a wrecked aircraft comprising a container adapted to be installed on the aircraft adjacent an outer surface thereof, a cover closing said container, a horizontally disposed locking bolt carried by the under face of said cover and spring biased to a projected position to hold said cover closed, a horizontally disposed lever pivoted intermediate its ends to the under face of said cover and having one end pivotally and slidably connected to the adjacent end of said bolt, said bolt being removable to a retracted position and release said cover responsive to impact of the aircraft to allow the cover to open, an inflatable balloon in the container, a vessel containing compressed buoyant gas in the container, flexible conduit means connecting the vessel to the balloon, normally closed valve means on the vessel between said flexible conduit means and the vessel, valve-opening means connected between the valve means and the cover and being formed and arranged to open said valve means responsive to the opening of the cover, whereby to inflate said balloon and to cause the balloon to rise out of the container, and a flexible cable of substantial length connecting the balloon to the container, whereby to retain the balloon above the aircraft after it has been released.

2. A device for locating a wrecked aircraft comprising a container adapted to be installed on the aircraft adjacent an outer surface thereof, a cover closing said container, a horizontally disposed locking bolt carried by the under face of said cover and spring biased to a projected position to hold said cover closed, a horizontally disposed lever pivoted intermediate its ends to the under face of said cover and having one end pivotally and slidably connected to the adjacent end of said bolt, said bolt being movable to a retracted position and release said cover responsive to impact of the aircraft to allow the cover to open, an inflatable balloon in the container, a vessel containing compressed buoyant gas in the container, flexible conduit means connecting the vessel to the balloon, normally closed valve means on the vessel between said flexible conduit means and the vessel, valve-opening means connected between the valve means and the cover and being formed and arranged to open said valve means responsive to the opening of the cover, whereby to inflate said balloon and to cause the balloon to rise out of the container, a reel rotatably mounted in the container, and a cable secured to and wound on the reel and connected to said balloon, said cable being adapted to unwind from said reel, whereby to retain the balloon above the aircraft after it has been released.

3. A device for locating a wrecked aircraft comprising a container adapted to be installed on the aircraft adjacent an outer surface thereof, a cover closing said container, a horizontally disposed locking bolt carried by the under face of said cover and spring biased to a projected position to hold said cover closed, a horizontally disposed lever pivoted intermediate its ends to the under face of said cover and having one end pivotally and slidably connected to the adjacent end of said bolt, said bolt being movable to a retracted position and release said cover responsive to impact of the aircraft to allow the cover to open, a smoke pot in the container containing smoke gas under pressure and having a pivoted closure normally bearing against the cover, spring means bearing between the bottom of the smoke pot and the bottom of the container and biasing the cover to an open position, removable pin means on the smoke pot engaging said closure and normally holding said closure in sealing position, flexible means connecting said pin means to the container and being formed and arranged to release the closure responsive to movement of the smoke pot out of the container, shock-responsive latch means holding the cover closed and being releasable responsive to impact of the aircraft to allow the cover to open, an inflatable balloon in the container, a vessel containing compressed buoyant gas in the container, flexible conduit means connecting the vessel to the balloon, normally closed valve means on the vessel between said flexible conduit means and the vessel, valve-opening means connected between the valve means and the cover and being formed and arranged to open said valve means responsive to the opening of the cover, whereby to inflate said balloon and to cause the balloon to rise out of the container, a reel rotatably mounted in the container, and a cable secured to and wound on the reel and connected to said balloon, said cable being adapted to unwind from said reel, whereby to retain the balloon above the aircraft after it has been released.

4. A device for locating a wrecked aircraft comprising a container adapted to be installed on the aircraft adjacent an outer surface thereof, a cover closing said container, a horizontally disposed locking bolt carried by the under face of said cover and spring biased to a projected position to hold said cover closed, a horizontally disposed lever pivoted intermediate its ends to the under face of said cover and having one end pivotally and slidably connected to the adjacent end of said bolt, said bolt being movable to a retracted position and release said cover responsive to impact of the aircraft to allow the cover to open, a smoke pot in the container containing smoke gas under pressure and having a pivoted closure normally bearing against the cover, spring means bearing between the bottom of the smoke pot and the bottom of the container and biasing the cover to an open position, removable pin means on the smoke pot engaging said closure and normally holding said closure in sealing position, flexible means connecting said pin to the container and being formed and arranged to release the closure responsive to movement of the smoke pot out of the container, shock-responsive latch means holding the cover closed and being releasable responsive to impact of the aircraft to allow the cover to open, an inflatable balloon in the container, a vessel containing compressed buoyant gas in in the container, flexible conduit means connecting the vessel to the balloon, normally closed valve means on the vessel between said flexible conduit means and the vessel, valve-opening means connected between the valve means and the cover and being formed and arranged to open said valve means responsive to the opening of the cover, whereby to inflate said balloon and to cause the balloon to rise out of the container, a reel rotatably mounted in the container, a cable secured to and wound on the reel and connected to said balloon, said cable being adapted to unwind from said reel, whereby to retain the balloon above the aircraft after it has been released.

5. A device for locating a wrecked aircraft comprising a container adapted to be installed on the aircraft adjacent an outer surface thereof, a cover detachably mounted on said container, a plurality of smoke pots in said container containing smoke gas under pressure, each pot having a pivoted closure and the pots being mounted so that their closures bear against the cover, a spring bearing between the bottom of each smoke pot and the bottom of the container, said springs biasing the cover to an open position, removable pin means on each smoke pot and engaging its closure, normally holding the closure in sealing position, respective flexible members connecting the pin means to the container and being formed and arranged to remove the pin means and release the closure responsive to movement of the smoke pots out of the container, shock-responsive latch means holding the cover closed and being releasably responsive to impact of the aircraft to allow the cover to open, an inflatable balloon in the container, a vessel containing compressed buoyant gas in the container, flexible conduit means connecting the vessel to the balloon, normally closed valve means on the vessel between said flexible conduit means and the vessel, valve-opening means connected between the valve means and the cover and being formed and arranged to open said valve means responsive to the opening of the cover, whereby to inflate said balloon and to cause the balloon to rise out of the container, a reel rotatably mounted in the container, a cable secured to and wound on the reel and connected to said balloon, said cable being adapted to unwind from said reel, whereby to retain the balloon above the aircraft after it has been released, and friction means on the container and frictionally engaging the reel to retard rotation thereof.

References Cited in the file of this patent
UNITED STATES PATENTS

| | | |
|---|---|---|
| 1,836,495 | Paulson | Dec. 15, 1931 |
| 2,139,919 | Watkins | Dec. 13, 1938 |
| 2,160,974 | Lureck | June 6, 1939 |
| 2,334,552 | Hammond | Nov. 16, 1943 |
| 2,346,325 | Oliver | Apr. 11, 1944 |
| 2,357,417 | Marple | Sept. 5, 1944 |
| 2,380,587 | Fenton | July 31, 1945 |
| 2,500,809 | Fennessy | Mar. 14, 1950 |
| 2,592,461 | Perkins | Apr. 8, 1952 |
| 2,778,332 | Talbot | Jan. 22, 1957 |